US010929984B2

(12) United States Patent
Zhang

(10) Patent No.: US 10,929,984 B2
(45) Date of Patent: Feb. 23, 2021

(54) SYSTEMS AND METHODS FOR SHAKING ACTION RECOGNITION BASED ON FACIAL FEATURE POINTS

(71) Applicant: BEIJING DIDI INFINITY TECHNOLOGY AND DEVELOPMENT CO., LTD., Beijing (CN)

(72) Inventor: Xiubao Zhang, Beijing (CN)

(73) Assignee: BEIJING DIDI INFINITY TECHNOLOGY AND DEVELOPMENT CO.. LTD., Beijing (CN)

( * ) Notice: Subject to any disclaimer, the term of this patent is extended or adjusted under 35 U.S.C. 154(b) by 0 days.

(21) Appl. No.: 16/897,303

(22) Filed: Jun. 10, 2020

(65) Prior Publication Data
US 2020/0302618 A1 Sep. 24, 2020

Related U.S. Application Data

(63) Continuation of application No. PCT/CN2018/084425, filed on Apr. 25, 2018.

(51) Int. Cl.
*G06T 7/20* (2017.01)
*G06T 7/246* (2017.01)
*G06K 9/00* (2006.01)

(52) U.S. Cl.
CPC .......... *G06T 7/246* (2017.01); *G06K 9/00248* (2013.01); *G06K 9/00255* (2013.01); *G06K 9/00281* (2013.01)

(58) Field of Classification Search
CPC .................. G06F 21/32; G06F 3/04886; G06F 2203/011; G06F 3/013; G06F 3/017;
(Continued)

(56) References Cited

U.S. PATENT DOCUMENTS 7,650,017 B2  1/2010 Yamada
8,331,616 B2 12/2012 Sabe et al.
(Continued)

FOREIGN PATENT DOCUMENTS

CN   101976450 A   2/2011
CN   102999104 A   3/2013
(Continued)

OTHER PUBLICATIONS

International Search Report in PCT/CN2018/084425 dated Jan. 29, 2019, 4 pages.
(Continued)

*Primary Examiner* — Quan M Hua
(74) *Attorney, Agent, or Firm* — Metis IP LLC

(57) ABSTRACT

The present disclosure relates to systems and methods for action recognition. The systems and methods may obtain a plurality of sequential target image frames associated with facial information of an object. Each of the plurality of sequential target image frames may include a plurality of feature points associated with the facial information. The systems and methods may determine a first area and a second area based on the plurality of feature points in each of the plurality of sequential target image frames. The systems and methods may determine an asymmetry parameter in each of the plurality of sequential target image frames based on the first area and the second area. The systems and methods may identify a shaking action in response to that the asymmetry parameter satisfies a preset condition.

20 Claims, 9 Drawing Sheets

(58) Field of Classification Search
CPC ........... G06K 9/00248; G06K 9/00241; G06K 9/00315; G06K 9/00604; G06K 9/6267; G06K 9/00255; G06K 9/00281; G06K 9/00288; G06K 9/00335; G06K 9/00711; G06K 9/00906; G02B 2027/0138; G02B 2027/014; G02B 2027/0141; G02B 2027/0187
See application file for complete search history.

(56) References Cited

U.S. PATENT DOCUMENTS

| | | | | |
|---|---|---|---|---|
| 8,798,336 | B2 * | 8/2014 | Nechyba | G06K 9/00315 382/118 |
| 9,117,109 | B2 | 8/2015 | Nechyba et al. | |
| 2008/0317297 | A1 * | 12/2008 | Willmann | G06T 7/0012 382/118 |
| 2009/0180666 | A1 * | 7/2009 | Sheng | A61B 5/1127 382/103 |
| 2010/0238030 | A1 * | 9/2010 | Shafer | G08B 13/193 340/552 |
| 2012/0300982 | A1 | 11/2012 | Tanase et al. | |

FOREIGN PATENT DOCUMENTS

| | | |
|---|---|---|
| CN | 103279253 A | 9/2013 |
| CN | 105518711 A | 4/2016 |
| CN | 106295549 A | 1/2017 |
| CN | 107464291 A | 12/2017 |
| CN | 107622188 A | 1/2018 |
| CN | 107679446 A | 2/2018 |

OTHER PUBLICATIONS

Written Opinion in PCT/CN2018/084425 dated Jan. 29, 2019, 4 pages.
The Extended European Search Report in European Application No. 18916720.5 dated Nov. 24, 2020, 9 pages.
Afifa Dahmane et al., Head Pose Estimation Based on Face Symmetry Analysis, Signal, Image and Video Processing, 9(8)L 1871-1880, 2014.
Karen L. Schmidt et al., Movement Differences between Deliberate and Spontaneous Facial Expressions: Zygomaticus Major Action in Smiling, Journal of Nonverbal Behavior, 30(1): 34-52, 2006.

* cited by examiner

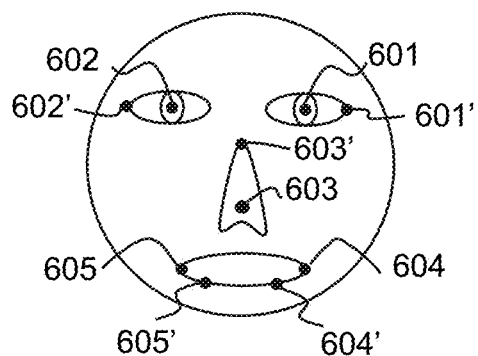
FIG. 6-A
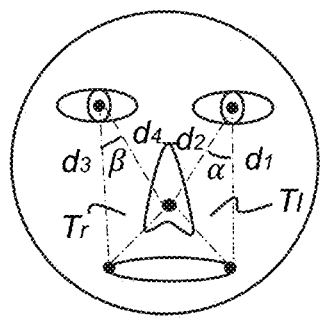
FIG. 6-B

SYSTEMS AND METHODS FOR SHAKING ACTION RECOGNITION BASED ON FACIAL FEATURE POINTS

CROSS-REFERENCE TO RELATED APPLICATIONS

This application is a continuation of International Patent Application No. PCT/CN2018/084425 filed on Apr. 25, 2018, which designates the United States of America, the contents of which are hereby incorporated by reference in their entirety.

TECHNICAL FIELD

The present disclosure generally relates to systems and methods for action recognition, and in particular, to systems and methods for shaking action recognition based on facial feature points.

BACKGROUND

Living body detection based on action recognition (e.g., shaking head action recognition) has become increasingly important in many scenarios (e.g., system login, identity authentication, and Human-Computer Interaction). Take "system login" as an example, when a user intends to login to the system via face recognition, it may be necessary to verify that the "user" is a living body rather than a fake (e.g., a picture). In the current shaking head motion recognition, three-dimensional information is acquired mainly by Microsoft's Kinect, and then Hidden Markov Model is used for category-based machine learning. The system involves a complex algorithm which demands a high computing capacity, resulting in a heavy system load and failing to meet real-time needs. Therefore, it is desirable to provide efficient and quick systems and methods, which require a lower computing capacity for identifying an action of a user.

SUMMARY

An aspect of the present disclosure relates to a system for action recognition. The system may include at least one storage medium including a set of instructions and at least one processor in communication with the at least one storage medium. When the at least one processor executes the set of instructions, the at least one processor may be directed to cause the system to perform one or more of the following operations. The at least one processor may obtain a plurality of sequential target image frames associated with facial information of an object. Each of the plurality of sequential target image frames may include a plurality of feature points associated with the facial information. The at least one processor may determine a first area and a second area based on the plurality of feature points in each of the plurality of sequential target image frames. The at least one processor may determine an asymmetry parameter in each of the plurality of sequential target image frames based on the first area and the second area. The at least one processor may identify a shaking action in response to that the asymmetry parameter satisfies a preset condition.

Another aspect of the present disclosure relates to a method for action recognition implemented on a computing device having at least one processor, at least one storage device, and a communication platform connected to a network. The method may include one or more of the following operations. The at least one processor may obtain a plurality of sequential target image frames associated with facial information of an object. Each of the plurality of sequential target image frames may include a plurality of feature points associated with the facial information. The at least one processor may determine a first area and a second area based on the plurality of feature points in each of the plurality of sequential target image frames. The at least one processor may determine an asymmetry parameter in each of the plurality of sequential target image frames based on the first area and the second area. The at least one processor may identify a shaking action in response to that the asymmetry parameter satisfies a preset condition.

A further aspect of the present disclosure relates to a non-transitory computer readable medium comprising at least one set of instructions for action recognition. When the at least one set of instructions is executed by at least one processor, the at least one set of instructions may cause the at least one processor to effectuate a method. The method may include one or more of the following operations. The at least one processor may obtain a plurality of sequential target image frames associated with facial information of an object. Each of the plurality of sequential target image frames may include a plurality of feature points associated with the facial information. The at least one processor may determine a first area and a second area based on the plurality of feature points in each of the plurality of sequential target image frames. The at least one processor may determine an asymmetry parameter in each of the plurality of sequential target image frames based on the first area and the second area. The at least one processor may identify a shaking action in response to that the asymmetry parameter satisfies a preset condition.

In some embodiments, the plurality of feature points may include a first feature point, a second feature point, a third feature point, a fourth feature point, and a fifth feature point. In some embodiments, the first feature point and the second feature point may be symmetrical relative to a vertical center line associated with the facial information; the fourth feature point and the fifth feature point may be symmetrical relative to the vertical center line associated with the facial information; and the third feature point may be on the vertical center line associated with the facial information.

In some embodiments, the first feature point may be a central point of a left eye; the second feature point may be a central point of a right eye; the third feature point may be a tip point of a nose; the fourth feature point may be a left end point of a lip; and the fifth feature point may be a right end point of the lip.

In some embodiments, the at least one processor may determine the first area based on the first feature point, the third feature point, and the fourth feature point. The at least one processor may determine the second area based on the second feature point, the third feature point, and the fifth feature point.

In some embodiments, the at least one processor may determine a first ratio of the first area to the second area. The at least one processor may determine a second ratio of the second area to the first area. The at least one processor may determine a larger one of the first ratio and the second ratio as the asymmetry parameter.

In some embodiments, the at least one processor may obtain a plurality of sequential candidate image frames associated with the facial information of the object, wherein for each of the sequential candidate image frames, the third feature point is within a quadrangle determined based on the first feature point, the second feature point, the fourth feature point, and the fifth feature point. The at least one processor may identify a start image frame of the plurality of sequential target image frames from the plurality of sequential candidate image frames, wherein the asymmetry parameter corresponding to the start image frame is less than a min asymmetry ratio threshold. The at least one processor may identify an end image frame of the plurality of sequential target image frames from the plurality of sequential candidate image frames, wherein the asymmetry parameter corresponding to the end image frame is less than the min asymmetry ratio threshold.

In some embodiments, the at least one processor may identify a middle image frame having the maximum asymmetry parameter from the plurality of sequential target image frames. The at least one processor may determine a first number count of sequential target image frames from the start image frame to the middle image frame and a second number count of sequential target image frames from the middle image frame to the end image frame. The at least one processor may determine an estimated line by fitting the third feature points in the plurality of sequential target image frames. The at least one processor may identify the shaking action in response to that the asymmetry parameter of the middle image frame is larger than a max asymmetry ratio threshold, the first number count is larger than a first number count threshold, the second number count is larger than a second number count threshold, and an angle between the estimated line and a horizontal line is less than an angle threshold.

In some embodiments, the min asymmetry ratio threshold may be 1.01-1.02.

In some embodiments, the max asymmetry ratio threshold may be 1.2-1.3.

In some embodiments, the first number count threshold may be 2-10 and second number count threshold may be 2-10.

In some embodiments, the angle threshold may be 5°-20°.

In some embodiments, the at least one processor may provide an authentication to a terminal device associated with the object in response to the identification of the shaking action.

In some embodiments, the system may further include a camera, which may be configured to provide video data, form which the plurality of sequential target image frames may be obtained.

In some embodiments, the at least one processor may obtain the plurality of target image frames from video data provided by a camera.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting schematic embodiments, in which like reference numerals represent similar structures throughout the several views of the drawings, and wherein:

FIG. 6-A is a schematic diagram illustrating exemplary feature points on a face according to some embodiments of the present disclosure;

FIG. 6-B is a schematic diagram illustrating an exemplary first area and an exemplary second area determined based on feature points according to some embodiments of the present disclosure;

DETAILED DESCRIPTION

Figure 1:
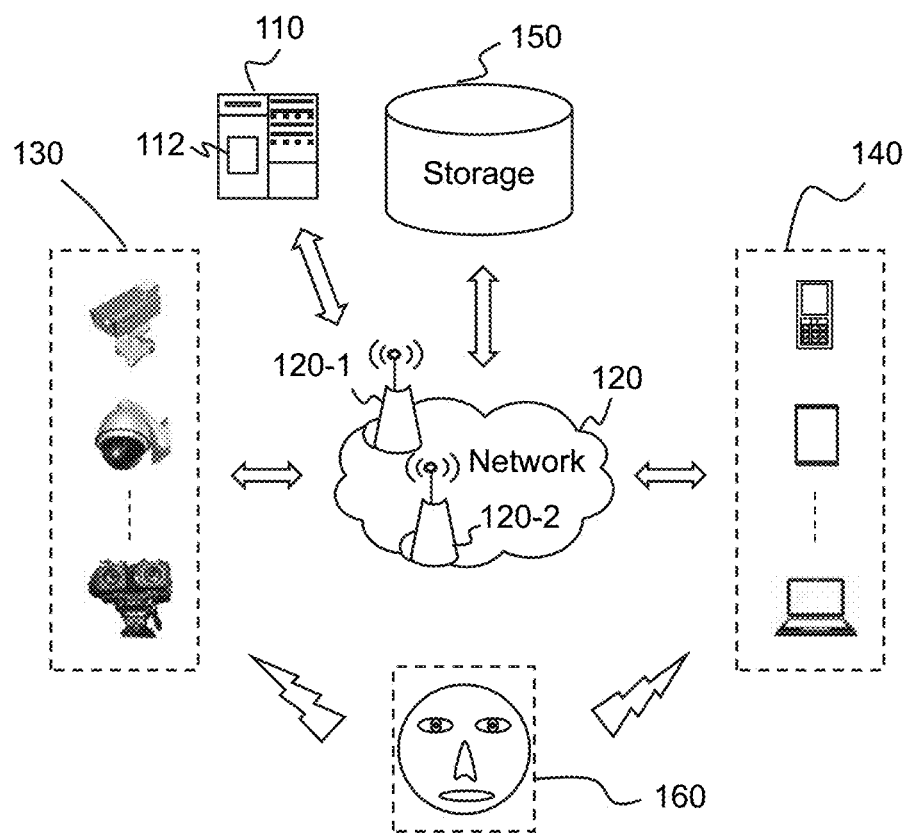
FIG. 1 is a schematic diagram illustrating an exemplary action recognition system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods disclosed in the present disclosure is described primarily regarding a shaking action identification, it should also be understood that this is only one exemplary embodiment. The systems and methods of the present disclosure may be applied to any other kind of action recognition. For example, the systems and methods of the present disclosure may be applied to other action recognitions including an eye movement, a blink action, a nod action, a head up action, a mouth opening action, or the like, or any combination thereof. The action recognition system may be applied in many application scenarios such as, system login, identity authentication, Human-Computer Interaction (HCI), etc. The application of the systems and methods of the present disclosure may include a web page, a plug-in of a browser, a client terminal, a custom system, an internal analysis system, an artificial intelligence robot, or the like, or any combination thereof.

The terms "object," "human," or "user" in the present disclosure are used interchangeably to refer to a living body whose action is to be identified. Also, the terms "image frame," "image," "candidate image frames," and "target image frames" in the present disclosure are used to refer to frames in video data or images captured by a camera device. The terms "camera," "camera device," and "capture device" in the present disclosure may be used interchangeably to refer to a device that can capture video data or image data.

An aspect of the present disclosure relates to systems and methods for action recognition (e.g., an action recognition in living body detection). Take a shaking action as an example, during the shaking action, an area associated with a left side of a face of an object and an area associated with a right side of the face may dynamically change. Accordingly, an asymmetry parameter associated with the left side and the right side may also dynamically change during the shaking action. The systems and methods in the present disclosure may identify the shaking action based on the change of the asymmetry parameter. For example, the systems and methods may obtain a plurality of sequential target image frames associated with facial information of the object. Each of the plurality of sequential target image frames includes a plurality of feature points associated with the facial information. For each of the plurality of sequential target image frames, the systems and methods may determine a first area associated with the left side and a second are associated with the right side based on the plurality of feature points, and determine the asymmetry parameter based on the first area and the second area. Further, the systems and methods may identify the shaking action based on the asymmetry parameters of the plurality of sequential target image frames.

FIG. 1 is a schematic diagram illustrating an exemplary action recognition system according to some embodiments of the present disclosure. For example, the action recognition system 100 may be an online action recognition platform for shaking action identification based on facial information of an object (e.g., a human).

In some embodiments, the action recognition system 100 may be used in a variety of application scenarios such as Human-Computer Interaction (HCI), system login, identity authentication, or the like, or any combination thereof. In the application scenario of HCI, the action recognition system 100 may execute instructions to perform operations defined by a user in response to an identification of an action. For example, after extracting facial information of the user and identifying an action (e.g., a shaking action) of the user, the action recognition system 100 may execute instructions to perform defined operations such as turn a page of an e-book, add animation effects during a video chat, control a robot to perform an operation (e.g., mopping the floor), request a service (e.g., a taxi hailing service), etc. In the application scenario of system login (e.g., a bank system, an online examination system, a security and protection system), after extracting facial information of the user and identifying an action (e.g., a shaking action) of the user, the action recognition system 100 may determine a login permission and allow a user account associated with the user to login to the system. In the application scenario of identity authentication, after extracting facial information of the user and identifying an action (e.g., a shaking action) of the user, the action recognition system 100 may determine the user's identity and provide a permission to access an account (e.g., a terminal device, a payment account, a membership account) or a permission to enter a confidential place (e.g., a company, a library, a hospital, an apartment).

In some embodiments, the action recognition system 100 may be an online platform including a server 110, a network 120, a camera device 130, a user terminal 140, and a storage 150.

The server 110 may be a single server or a server group. The server group may be centralized, or distributed (e.g., server 110 may be a distributed system). In some embodiments, the server 110 may be local or remote. For example, the server 110 may access information and/or data stored in the camera device 130, the user terminal 140, and/or the storage 150 via the network 120. As another example, the server 110 may be directly connected to the camera device 130, the user terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to action recognition to perform one or more functions described in the present disclosure. For example, the processing engine 112 may identify a shaking action based on a plurality of sequential target image frames associated with facial information of an object (e.g., an object 160). In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the camera device 130, the user terminal 140) of the action recognition system 100. For example, the processing engine 112 may be integrated in the camera device 130 or the user terminal 140 and the functions (e.g., identifying an action of an object based on image frames associated with facial information of the object) of the processing engine 112 may be implemented by the camera device 130 or the user terminal 140.

The network 120 may facilitate the exchange of information and/or data. In some embodiments, one or more components of the action recognition system 100 (e.g., the server 110, the camera device 130, the user terminal 140, the storage 150) may exchange information and/or data with other component(s) of the action recognition system 100 via the network 120. For example, the server 110 may obtain information and/or data (e.g., image frames) from the camera device 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the action recognition system 100 may be connected to the network 120 to exchange data and/or information.

The camera device 130 may capture image data or video data associated with an object. For example, the camera device 130 may capture a video including a plurality of image frames associated with facial information of the object. In some embodiments, the camera device 130 may include a black-white camera, a color camera, an infrared camera, an X-ray camera, etc. In some embodiments, the camera device 130 may include a monocular camera, a binocular camera, a multi-camera, etc. In some embodiments, the camera device 130 may be a smart device including or connected to a camera. The smart device may include a smart home device (e.g., a smart lighting device, a smart television), an intelligent robot (e.g., a sweeping robot, a mopping robot, a chatting robot, an industry robot), etc. In some embodiments, the camera device 130 may be a surveillance camera. The surveillance camera may include a wireless color camera, a low light camera, a vandal proof camera, a bullet camera, a pinhole camera, a hidden spy camera, a fixed box camera, or the like, or any combination thereof. In some embodiments, the camera device 130 may be an IP camera which can transmit the captured image data or video data to any component (e.g., the server 110, the user terminal 140, the storage 150) of the action recognition system 100 via the network 120.

In some embodiments, the camera device 130 may independently identify an action of the object based on the captured image frames. In some embodiments, the camera device 130 may transmit the captured image frames to the server 110 or the user terminal 140 to be further processed. In some embodiments, the camera device 130 may transmit the captured image frames to the storage 150 to be stored. In some embodiments, the camera device 130 may be integrated in the user terminal 140. For example, the camera device 130 may be part of the user terminal 140, such as a camera of a mobile phone, a camera of a computer, etc.

In some embodiments, the user terminal 140 may include a mobile device, a tablet computer, a laptop computer, or the like, or any combination thereof. In some embodiments, the mobile device may include a wearable device, a smart mobile device, a virtual reality device, an augmented reality device, or the like, or any combination thereof. In some embodiments, the wearable device may include a smart bracelet, a smart footgear, smart glasses, a smart helmet, a smart watch, smart clothing, a smart backpack, a smart accessory, or the like, or any combination thereof. In some embodiments, the smart mobile device may include a mobile phone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc.

In some embodiments, the user terminal 140 may exchange information and/or data with other components (e.g., the server 110, the camera device 130, the storage 150) of the action recognition system 100 directly or via the network 120. For example, the user terminal 140 may obtain image frames from the camera device 130 or the storage 150 to identify an action of an object based on the image frames. As another example, the user terminal 140 may receive a message (e.g., an authentication) from the server 110.

The storage 150 may store data and/or instructions. In some embodiments, the storage 150 may store data obtained from the camera device 130 and/or the user terminal 140. In some embodiments, the storage 150 may store data and/or instructions that the server 110 may execute or use to perform exemplary methods described in the present disclosure. In some embodiments, storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform.

Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the action recognition system 100 (e.g., the server 110, the camera device 130, the user terminal 140, etc.). One or more components of the action recognition system 100 may access the data or instructions stored in the storage 150 via the network 120. In some embodiments, the storage 150 may be directly connected to or communicate with one or more components of the action recognition system 100 (e.g., the server 110, the camera device 130, the user terminal 140, etc.). In some embodiments, the storage 150 may be part of the server 110.

In some embodiments, one or more components (e.g., the server 110, the camera device 130, the user terminal 140) of the action recognition system 100 may have permission to access the storage 150. For example, the user terminal 140 may access information/data (e.g., image frames associated with the facial information of the object) from the storage 150.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage 150 may be a data storage including cloud computing platforms, such as, public cloud, private cloud, community, and hybrid clouds, etc. However, those variations and modifications do not depart the scope of the present disclosure.

Figure 2:
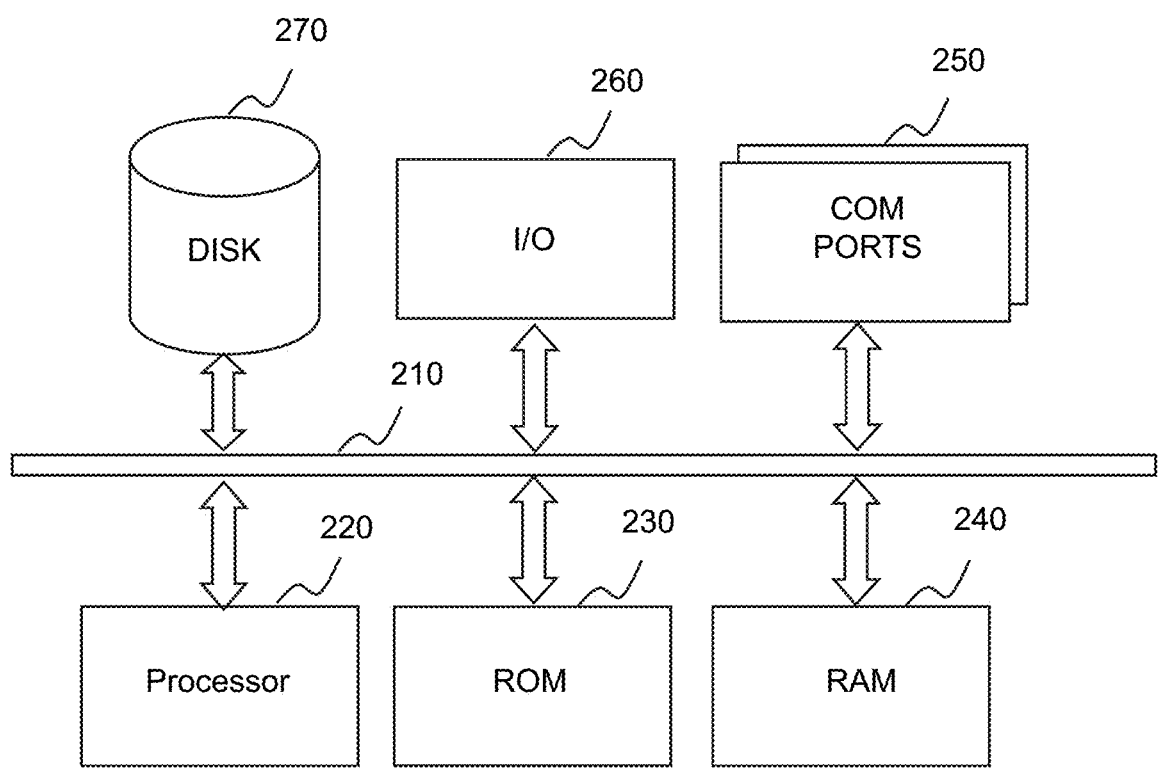
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, the camera device 130, and/or the user terminal 140 may be implemented according to some embodiments of the present disclosure. For example, the processing engine 112 may be implemented on the computing device 200 and configured to perform functions of the processing engine 112 disclosed in this disclosure.

The computing device 200 may be used to implement any component of the action recognition system 100 as described herein. For example, the processing engine 112 may be implemented on the computing device, via its hardware, software program, firmware, or a combination thereof. Although only one such computer is shown, for convenience, the computer functions relating to the action recognition service as described herein may be implemented in a distributed fashion on a number of similar platforms, to distribute the processing load.

The computing device 200, for example, may include COM ports 250 connected to and/or from a network connected thereto to facilitate data communications. The computing device 200 may also include a processor (e.g., a processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms, for example, a disk 270, and a read only memory (ROM) 230, or a random access memory (RAM) 240, for various data files to be processed and/or transmitted by the computer. The computing device 200 may also include program instructions stored in the ROM 230, RAM 240, and/or other type of non-transitory storage medium to be executed by the processor 220. The method and/or process of the present disclosure may be implemented as the program instructions. The computer device 200 also includes an I/O component 260, supporting input/output between the computer and other components. The computing device 200 may also receive programming and data via network communications.

Merely for illustration, only one CPU and/or processor is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
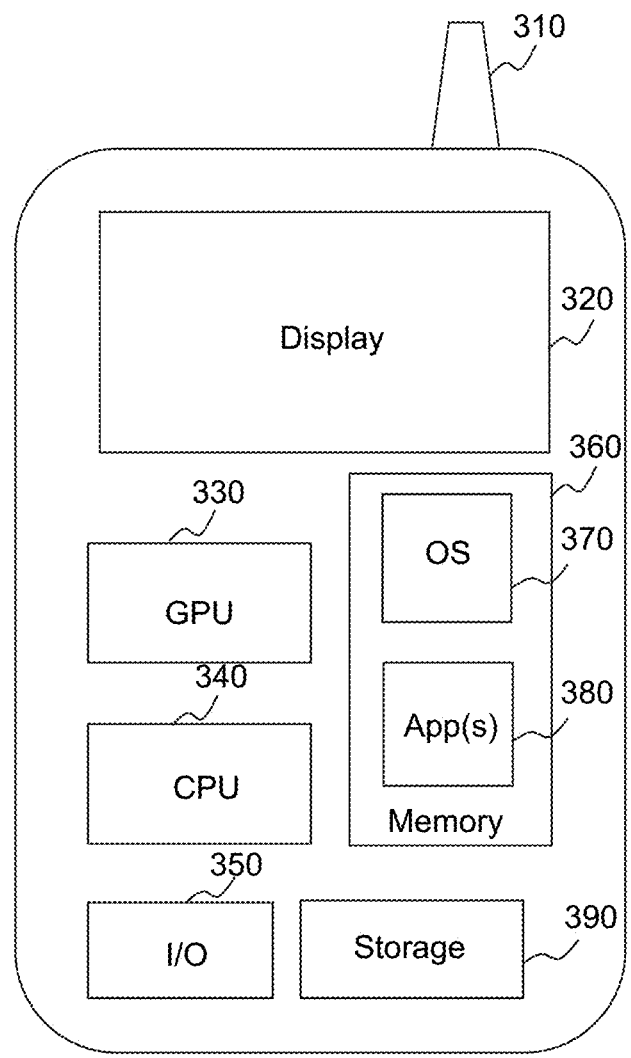
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 on which the camera device 130, the user terminal 140, or part of the camera device 130 or the user terminal 140 may be implemented according to some embodiments of the present disclosure. As illustrated in FIG. 3, the mobile device 300 may include a communication module 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300.

In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information from the action recognition system 100 on the mobile device 300. User interactions with the information stream may be achieved via the I/O devices 350 and provided to the processing engine 112 and/or other components of the action recognition system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
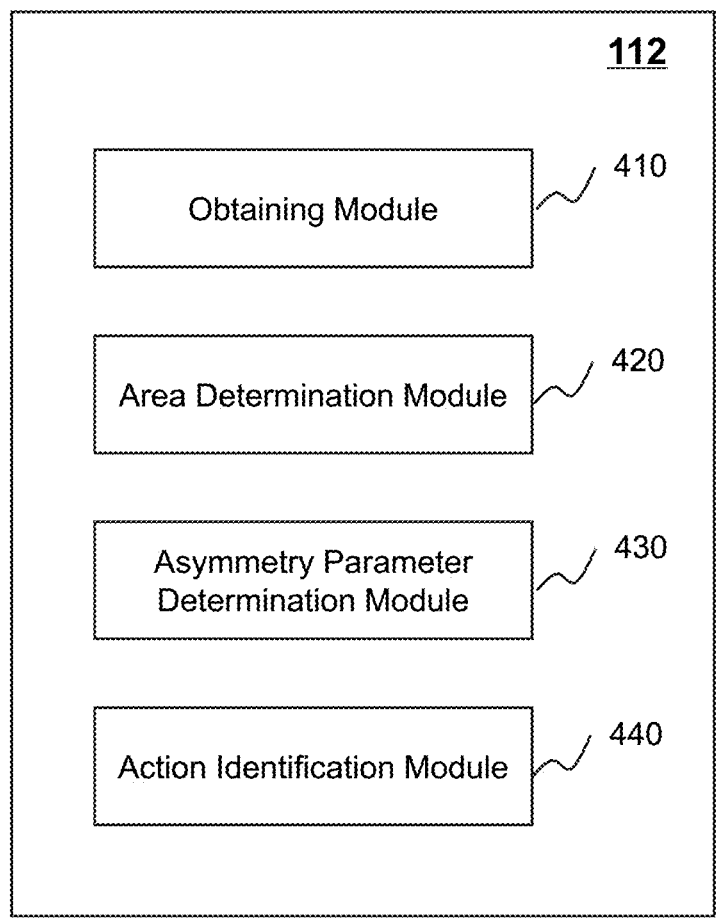
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include an obtaining module 410, an area determination module 420, an asymmetry parameter determination module 430, and an action identification module 440.

The obtaining module 410 may be configured to obtain a plurality of sequential target image frames associated with facial information of an object (e.g., a human, an animal). The obtaining module 410 may obtain the plurality of sequential target image frames from the camera device 130, the user terminal 140, or a storage device (e.g., the storage 150) disclosed elsewhere in the present disclosure.

As used herein, an "image frame" may refer to a frame in a video, and "sequential" may refer to that the image frames are ordered along a sequence in the video. For example, the camera device 130 may capture a video in chronological order. The video includes a plurality of image frames corresponding to a plurality of capture time points respectively. Accordingly, the image frames are ordered chronologically based on the capture time points.

In some embodiments, each of the plurality of sequential target image frames may include a plurality of feature points associated with the facial information of the object. The facial information of the object may include geometric information (e.g., a position, a size, a shape) of facial organs, color information (e.g., skin color), brightness information, etc. The facial organ may include a forehead, a brow, an eye, a nose, a lip, an ear, a chin, etc. As used herein, a "feature point" associated with the facial information may refer to a point located on the face which is recognizable, for example, a point on an end of an eye, a point on a brow, a point on a nose, etc. In some embodiments, the obtaining module 410 may extract the plurality of feature points based on a facial feature point extraction method. The facial feature point extraction method may include an active shape model-based method, an active appearance model-based method, a regression analysis-based method, a deep learning-based method, a classifier-based method, or the like, or any combination thereof.

The area determination module 420 may be configured to determine a first area and a second area based on the plurality of feature points in each of the plurality of sequential target image frames. As used herein, the first area may correspond to a region associated with a left side of the face and the second area may correspond to a region associated with a right side of the face. The region here may be a region of any shape (e.g., a triangle, a rectangle, a polygon, an irregular shape).

The asymmetry parameter determination module 430 may be configured to determine an asymmetry parameter in each of the plurality of sequential target image frames based on the first area and the second area. As used herein, the "asymmetry parameter" may refer to a parameter indicating an asymmetry between the left side of the face and the right side of the face. As described above, the first area and the second area correspond to a region associated with the left side and a region associated with the right side respectively, therefore, a ratio associated with the first area and the second area may indicate the asymmetry between the left side and the right side.

The action identification module 440 may be configured to identify a shaking action in response to that the asymmetry parameter satisfies a preset condition. It is known that during the shaking action, the face of the object moves with the shaking action. Therefore, the first area associated with the left side of the face and the second area associated with the right side of face dynamically change in the plurality of sequential target image frames during the shaking action. Accordingly, the asymmetry parameter indicating the asymmetry between the left side and the right side dynamically changes during the shaking action. Therefore, the action identification module 440 may identify the shaking action based on the asymmetry parameter.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined as a single module, and any one of the modules may be divided into two or more units. For example, the obtaining module 410 and the area determination module 420 may be combined as a single module which may both obtain the plurality of sequential target image frames and determine the first area and the second area based on the feature points included in the target image frames. As another example, the processing engine 112 may include a storage module (not shown in FIG. 4) which may be configured to store any information and/or data associated with the facial information of the object.

Figure 5:
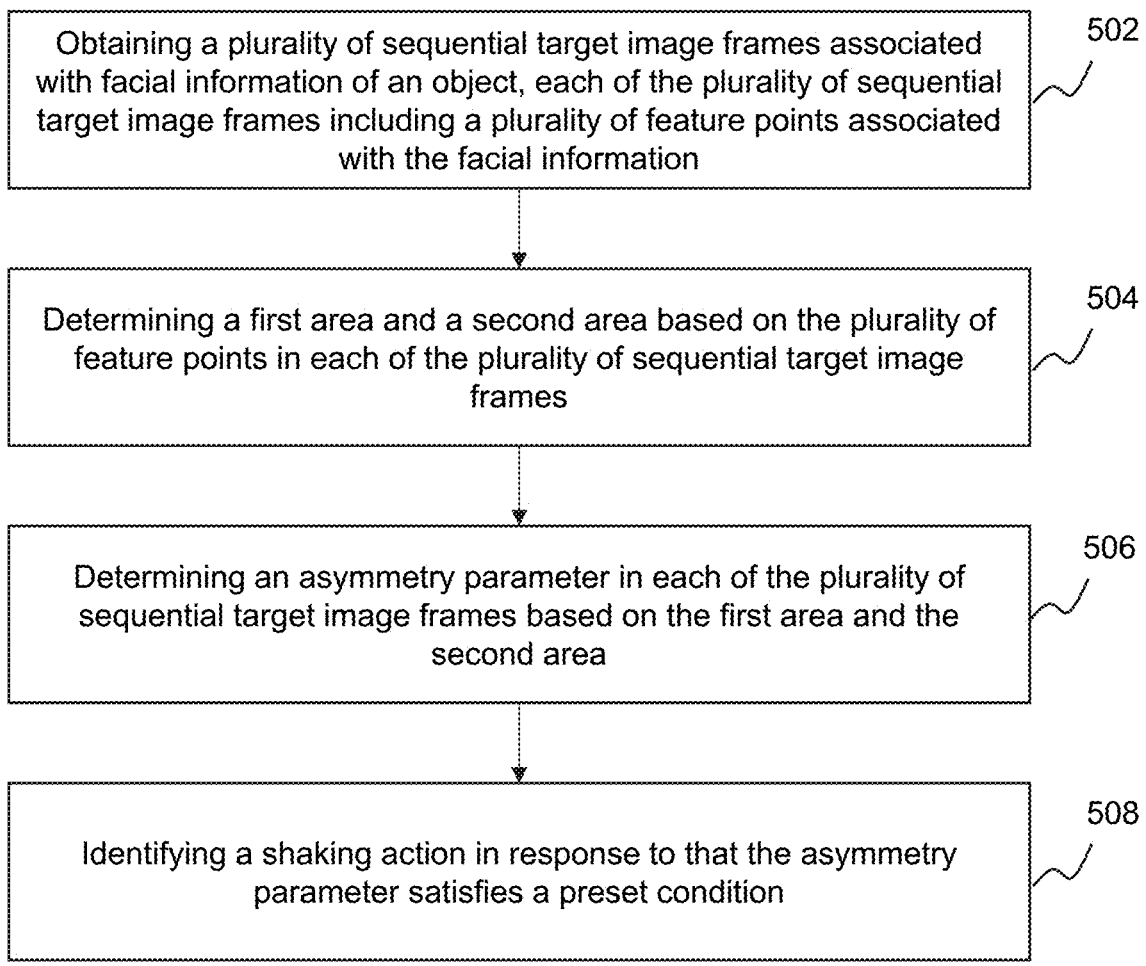
FIG. 5 is a flowchart illustrating an exemplary process for identifying a shaking action according to some embodiments of the present disclosure.

FIG. 5 is a flowchart illustrating an exemplary process for identifying a shaking action according to some embodiments of the present disclosure. The process 500 may be implemented as a set of instructions (e.g., an application) stored in the storage ROM 230 or RAM 240. The processor 220 and/or the modules illustrated in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations discussed. Additionally, the order in which the operations of the process as illustrated in FIG. 5 and described below is not intended to be limiting.

In 502, the processing engine 112 (e.g., the obtaining module 410) (e.g., the interface circuits of the processor 220) may obtain a plurality of sequential target image frames associated with facial information of an object (e.g., a human, an animal). The processing engine 112 may obtain the plurality of sequential target image frames from the camera device 130, the user terminal 140, or a storage device (e.g., the storage 150) disclosed elsewhere in the present disclosure.

As used herein, an "image frame" may refer to a frame in a video, and "sequential" may refer to that the image frames are ordered along a sequence in the video. For example, the camera device 130 may capture a video in chronological order. The video includes a plurality of image frames corresponding to a plurality of capture time points respectively. Accordingly, the image frames are ordered chronologically based on the capture time points.

In some embodiments, the plurality of sequential target image frames may be expressed as an ordered set illustrated bellow:

$$F=[F_1, F_2, F_i, \ldots, F_m], \quad (1)$$

where $F_i$ refers to an ith target image frame and m refers to a number of the plurality of target image frames. In the ordered set, the plurality of sequential target image frames are ordered chronologically based on capture time points of the plurality of target image frames. For example, the target image frame $F_1$ corresponds to a first capture time point and the target image frame $F_2$ corresponds to a second capture time point, wherein the second capture time point is later than the first capture time point. The time interval between the first capture time point and the second capture time point may vary and also, be a default parameter of the camera device 130.

In some embodiments, each of the plurality of sequential target image frames may include a plurality of feature points associated with the facial information of the object. The facial information of the object may include geometric information (e.g., a position, a size, a shape) of facial organs, color information (e.g., skin color), brightness information, etc. The facial organ may include a forehead, a brow, an eye, a nose, a lip, an ear, a chin, etc. As used herein, a "feature point" associated with the facial information may refer to a point located on the face which is recognizable, for example, a point on an end of an eye, a point on a brow, a point on a nose, etc. In some embodiments, the processing engine 112 may extract the plurality of feature points based on a facial feature point extraction method. The facial feature point extraction method may include an active shape model-based method, an active appearance model-based method, a regression analysis-based method, a deep learning-based method, a classifier-based method, or the like, or any combination thereof.

In some embodiments, the plurality of feature points may include a first feature point, a second feature point, a third feature point, a fourth feature point, and a fifth feature point. The first feature point and the second feature point may be symmetrical relative to a vertical center line associated with the facial information, the fourth feature point and the fifth feature point may be symmetrical relative to the vertical center line associated with the facial information, and the third feature point is on the vertical center line associated with the facial information. For example, as illustrated in FIG. 6-A, the first feature point may be a central point of a left eye, the second feature point may be a central point of a right eye, the third feature point may be a tip point of a nose, the fourth feature point may be a left end point of a lip, and the fifth feature point may be a right end point of the lip.

In 504, the processing engine 112 (e.g., the area determination module 420) (e.g., the processing circuits of the processor 220) may determine a first area and a second area based on the plurality of feature points in each of the plurality of sequential target image frames. As used herein, the first area may correspond to a region associated with a left side of the face and the second area may correspond to a region associated with a right side of the face. The region here may be a region of any shape (e.g., a triangle, a rectangle, a polygon, an irregular shape).

As described above, take "five feature points" as an example, the first area corresponds to a region determined based on the first feature point, the second feature point, and the third feature point, and the second area corresponds to a region determined based on the fourth feature point, the fifth feature point, and the third feature point (details may be found in FIG. 6-B and the description thereof).

In some embodiments, the processing engine 112 may determine the first area and the second area based on coordinates of the plurality of feature points. Also take "five feature points" as an example, a coordinate of a feature point may be expressed as below:

$$P(x_i, y_i), (i=1, 2, 3, 4, 5) \tag{2}$$

where $P(x_i, y_i)$ refers to a coordinate of an ith feature point, $x_i$ refers to a horizontal coordinate of the ith feature point, and $y_i$ refers to a vertical coordinate of the ith feature point. For illustration purposes, the present disclosure takes a rectangular coordinate system as an example, it should be noted that the coordinates of the plurality of feature points may be expressed in any coordinate system (e.g., a polar coordinate system) and an origin of the coordinate system may be any point in the image frame.

Further, the processing engine 112 may determine the first area and the second area based on the coordinates of the five feature points according to formula (3) and formula (4) below respectively:

$$T_l = (x_1{}^*y_3 + x_3{}^*y_4 + x_4{}^*x_1{}^*y_4 - x_3{}^*x_4{}^*y_3)/2, \tag{3}$$

$$T_r = (x_2{}^*y_5 + x_5{}^*y_3 + x_3{}^*y_2 - x_2{}^*y_3 - x_5{}^*y_2 - x_3{}^*y_5)/2, \tag{4}$$

where $T_l$ refers to the first area and $T_r$ refers to the second area.

It should be noted that formula (3) and formula (4) above are provided for illustration purposes, and not intended to limit the scope of the present disclosure. An ordinary person in the art should understand that any method for determining an area of a triangle may be applied in the present disclosure. For example, as illustrated in FIG. 6-B, the processing engine 112 may determine a first distance between the first feature point and the fourth feature point, a second distance between the first feature point and the third feature point, and an angle between the first distance and the second distance. Further, the processing engine 112 may determine the first area according to formula (5) bellow:

$$T_l = d_1{}^* d_2{}^* \sin \alpha / 2 \tag{5}$$

where $d_1$ refers to the first distance, $d_2$ refers to the second distance, and $\alpha$ refers to the angle between the first distance and the second distance.

Similarly, The processing engine 112 may determine the second area according to formula (6) bellow:

$$T_r = d_3{}^* d_4{}^* \sin \beta / 2 \tag{6}$$

where $d_3$ refers to a third distance between the second feature point and the fifth feature point, $d_4$ refers to a fourth distance between the second feature point and the third feature point, and $\beta$ refers to the angle between the third distance and the fourth distance.

In 506, the processing engine 112 (e.g., the asymmetry parameter determination module 330) (e.g., the processing circuits of the processor 220) may determine an asymmetry parameter in each of the plurality of sequential target image frames based on the first area and the second area. As used herein, the "asymmetry parameter" may refer to a parameter indicating an asymmetry between the left side of the face and the right side of the face. As described above, the first area and the second area correspond to a region associated with the left side and a region associated with the right side respectively, therefore, a ratio associated with the first area and the second area may indicate the asymmetry between the left side and the right side.

In some embodiments, the processing engine 112 may determine a first ratio of the first area to the second area and a second ratio of the second area to the first area according to formula (7) and formula (8) respectively bellow:

$$R_1 = T_l / T_r \tag{7}$$

$$R_2 = T_r / T_l \tag{8}$$

where $R_1$ refers to the first ratio and $R_2$ refers to the second ratio.

Further, the processing engine 112 may determine a larger one of the first ratio and the second ratio as the asymmetry parameter according to formula (9) bellow:

$$Asy=\max(R_1,R_2) \qquad (9)$$

where Asy refers to the asymmetry parameter.

In 508, the processing engine 112 (e.g., the action identification module 440) (e.g., the processing circuits of the processor 220) may identify a shaking action in response to that the asymmetry parameter satisfies a preset condition. It is known that during the shaking action, the face of the object moves with the shaking action. Therefore, the first area associated with the left side of the face and the second area associated with the right side of face dynamically change in the plurality of sequential target image frames during the shaking action. Accordingly, the asymmetry parameter indicating the asymmetry between the left side and the right side dynamically changes during the shaking action.

Assuming that a start position and an end position of the shaking action both correspond to a time point when the face of the object is facing right to or substantially right to the camera device 130, in ideal conditions, the asymmetry parameter corresponding to the start position and the asymmetry parameter corresponding to the end position are both less than a min asymmetry ratio threshold (or both are approximate to 1). During the shaking action, there is a middle position (also referred to as a "stop position") where the face of the object stops moving (or starts moving back), which corresponds to a time point when the asymmetry between the left side and the right side is maximum. Accordingly, the processing engine 112 may identify a start image frame of the plurality of sequential target image frames which corresponds to or substantially corresponds to the start position, an end image frame of the plurality of sequential target image frames which corresponds to or substantially corresponds to the end position, and a middle image frame which corresponds to or substantially corresponds to the middle position, and identify the shaking action based on the asymmetry parameters of the start image frame, the end image frame, and the middle image frame. More descriptions of the identification of the shaking action may be found elsewhere in the present disclosure (e.g., FIGS. 7-8 and the descriptions thereof).

It should be noted that "substantially corresponds to" used herein refers to that a time interval between a capture time point when the image frame is captured and a time point corresponding to the position is less than a time threshold for an ordinary person in the art. It is known that the camera device 130 captures image frames according to a frame rate (which may be a default parameter), that is, capture time points of two adjacent image frames are not continuous (i.e., there is a time interval between the two capture time points). Therefore, take the "start position" as an example, the start image frame may not strictly correspond to a time point of the start position, but the capture time point of the start image frame may be a time point which is very close to the time point of the start position. In ideal conditions, we can consider that the two time points are the same.

In some embodiments, the processing engine 112 may further provide an authentication to a terminal device (e.g., the user terminal 140) associated with the object in response to the identification of the shaking action. After receiving the authentication, the object can have an access permission to the terminal device.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a feature point extraction operation) may be added before operation 502 in the process 500. In the feature point extraction operation, the processing engine 112 may extract the plurality of feature points in each of the plurality of sequential frame images and may further perform a face recognition based on the plurality of extracted feature points.

FIG. 6-A is a schematic diagram illustrating exemplary feature points on a face according to some embodiments of the present disclosure. As described in connection with 502, each of the plurality of sequential target image frames may include a plurality of feature points. As illustrated in FIG. 6-A, the plurality of feature points may include a first feature point 601, a second feature point 602, a third feature point 603, a fourth feature point 604, and a fifth feature point 605. The first feature point 601 is a central point of a left eye; the second feature point 602 is a central point of a right eye; the third feature point 603 is a tip point of a nose; the fourth feature point 604 is a left end point of a lip; and the fifth feature point 605 is a right end point of the lip.

It should be noted that the examples of the feature points illustrated in FIG. 6-A are provided for illustration purposes, and not intended to limit the scope of the present disclosure. In some alternative embodiments, the third feature point 603 may be any point (e.g., a nasal root point 603') on the vertical center line of the face. The first feature point 601 and the second feature point 602 may be two points (e.g., a point 601' and a point 602') which are symmetrical relative to the vertical line. The fourth feature point 604 and the fifth point 605 may be two points (e.g., a point 604' and a point 605') which are symmetrical relative to the vertical line.

FIG. 6-B is a schematic diagram illustrating an exemplary first area and an exemplary second area determined based on the feature points according to some embodiments of the present disclosure. As described in connection with 504, the processing engine 112 may determine the first area and the second area based on the plurality of feature points in each of the plurality of sequential target image frames. As illustrated in FIG. 6-B, the processing engine 112 may determine a triangle area $T_l$ (i.e., the first area) based on the first feature point 601, the third feature point 603, and the fourth feature point 604, and a triangle area $T_r$ (i.e., the second area) based on the second feature point 602, the third feature point 603, and the fifth feature point 605.

Figure 7:
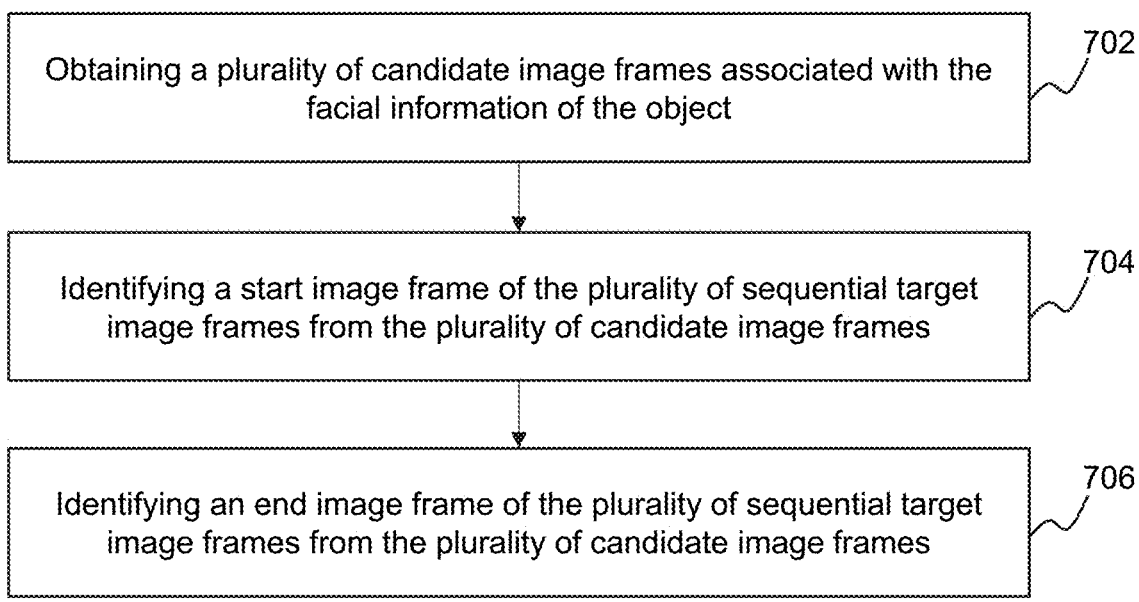
FIG. 7 is a flowchart illustrating an exemplary process for determining a plurality of sequential target image frames associated with facial information of an object according to some embodiments of the present disclosure.

FIG. 7 is a flowchart illustrating an exemplary process for determining a plurality of sequential target image frames associated with facial information of an object according to some embodiments of the present disclosure. The process 700 may be implemented as a set of instructions (e.g., an application) stored in the storage ROM 230 or RAM 240. The processor 220 and/or the modules illustrated in FIG. 4 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations discussed. Additionally, the order in which the operations of the process as illustrated in FIG. 7 and described below is not intended to be limiting. In some embodiments, operation 502 may be performed based on the process 700.

In 702, the processing engine 112 (e.g., the obtaining module 410) (e.g., the interface circuits of the processor 220) may obtain a plurality of sequential candidate image frames associated with the facial information of the object. As used herein, for each of the plurality of sequential candidate image frames, a third feature point is within a quadrangle determined based on the first feature point, the second feature point, the fourth feature point, and the fifth feature point.

In 704, the processing engine 112 (e.g., the obtaining module 410) (e.g., the processing circuits of the processor 220) may identify a start image frame of the plurality of sequential target image frames from the plurality of sequential candidate image frames. In some embodiments, the processing engine 112 may identify a candidate image frame with an asymmetry parameter that is less than a min asymmetry ratio threshold as the start image frame. In some embodiments, the min asymmetry ratio threshold may be default settings of the action recognition system 100, or may be adjustable under different situations. For example, the min asymmetry ratio threshold may be any value (e.g., 1.02) within a range from 1.01 to 1.1.

In 706, the processing engine 112 (e.g., the obtaining module 410) (e.g., the processing circuits of the processor 220) may identify an end image frame of the plurality of sequential target image frames from the plurality of sequential candidate image frames. In some embodiments, the processing engine 112 may identify a candidate image frame with an asymmetry parameter that is less than the min asymmetry ratio threshold as the end image frame. As described in connection with 502, the plurality of sequential target image frames are ordered chronologically based on the capture time points of the target image frames. Along the chronological order, for any target image frame between the start image frame and the end image frame, the asymmetry parameter is larger than or equal to the min asymmetry ratio threshold.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional operations (e.g., a storing operation) may be added elsewhere in the process 700. In the storing operation, the processing engine 112 may store any information and/or data associated with the image frames.

Figure 8:
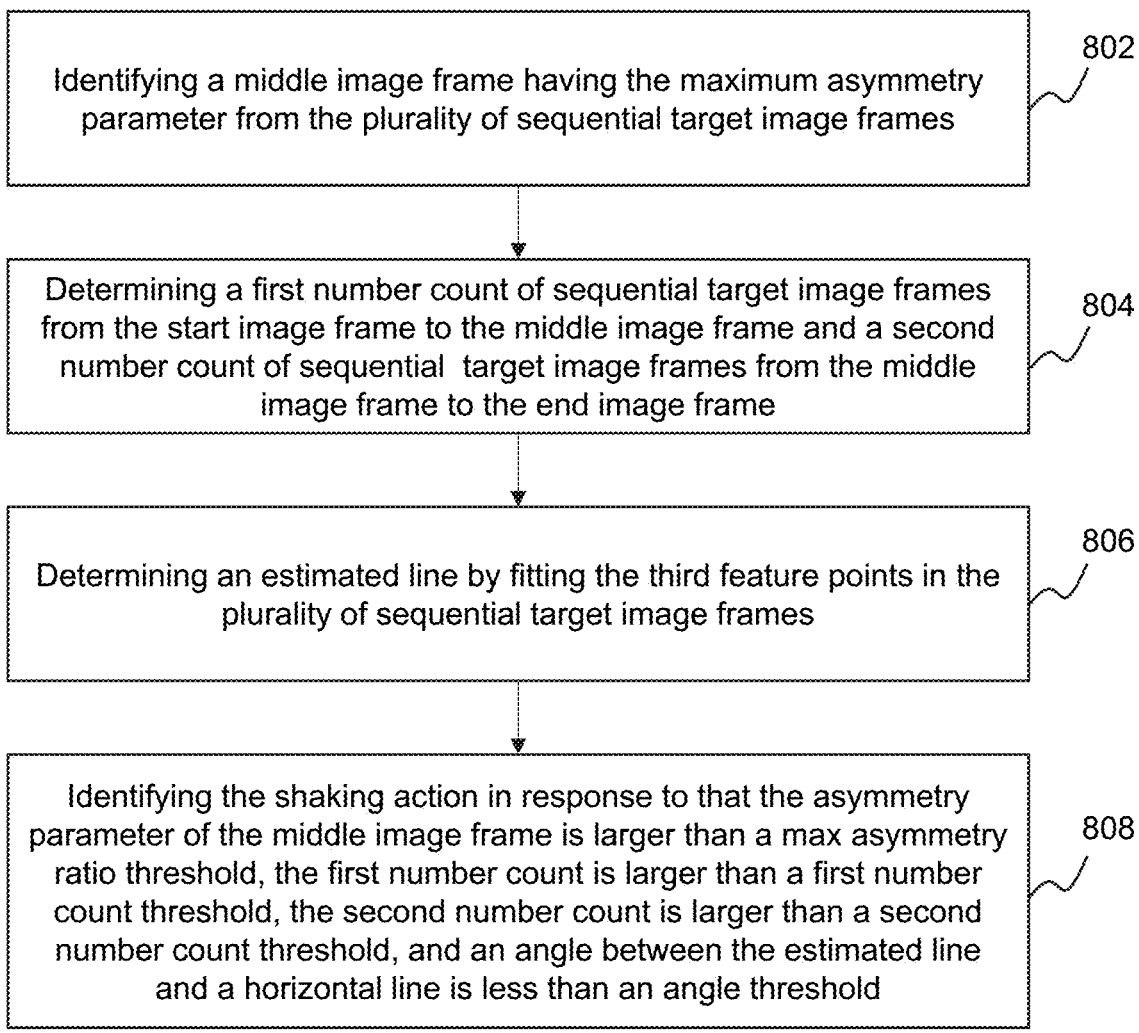
FIG. 8 is a flowchart illustrating an exemplary process for identifying a shaking action according to some embodiments of the present disclosure.

FIG. 8 is a flowchart illustrating an exemplary process for identifying a shaking action according to some embodiments of the present disclosure. The process 800 may be implemented as a set of instructions (e.g., an application) stored in the storage ROM 230 or RAM 240. The processor 220 and/or the modules illustrated in FIG. 4 may execute the set of instructions, and when executing the instructions, the processor 220 and/or the modules may be configured to perform the process 800. The operations of the illustrated process presented below are intended to be illustrative. In some embodiments, the process 900 may be accomplished with one or more additional operations not described and/or without one or more of the operations discussed. Additionally, the order in which the operations of the process as illustrated in FIG. 8 and described below is not intended to be limiting. In some embodiments, operation 508 may be performed based on the process 800.

In 802, the processing engine 112 (e.g., the action identification module 410) (e.g., the processing circuits of the processor 220) may identify a middle image frame having the maximum asymmetry parameter from the plurality of sequential target image frames.

In 804, the processing engine 112 (e.g., the action identification module 410) (e.g., the processing circuits of the processor 220) may determine a first number count of sequential target image frames from the start image frame to the middle image frame and a second number count of sequential target image frames from the middle image frame to the end image frame.

In 806, the processing engine 112 (e.g., the action identification module 440) (e.g., the processing circuits of the processor 220) may determine an estimated line by fitting the third feature points (e.g., a tip point of the nose) in the plurality of sequential target image frames. The processing engine 112 may fit the third feature points based on a fitting method, for example, a least square method, an interpolation method, an integral method, etc.

In 808, the processing engine 112 (e.g., the action identification module 440) (e.g., the processing circuits of the processor 220) may identify a shaking action in response to that the asymmetry parameter of the middle image frame is larger than a max asymmetry ratio threshold, the first number count is larger than a first number count threshold, the second number count is larger than a second number count threshold, and an angle between the estimated line and a horizontal line is less than an angle threshold.

In some embodiments, the max asymmetry ratio threshold may be default settings of the action recognition system 100, or may be adjustable under situations. For example, the max asymmetry ratio threshold may be any value (e.g., 1.2) within a range from 1.2 to 1.4.

In some embodiments, the first number count threshold and the second number count threshold may be default settings of the action recognition system 100. For example, the first number count threshold or the second number count threshold may be any value (e.g., 4) within a range from 2 to 10. In some embodiments, the first number count threshold and the second number count threshold may be adjustable according to a frame rate of the camera device 130. The frame rate may refer to a number of image frames captured by the camera device 130 per unit time (e.g., per second). The larger the frame rate of the camera device 130 is, the larger the first number count threshold or the second number count threshold may be. In some embodiments, the first number count threshold and the second number count threshold may be the same or different.

In some embodiments, the estimated line fitted based on the third feature points may be a straight line. The angle between the estimated line and the horizontal line may be an angle between two straight lines. In some embodiments, the estimated line may be a curve. The angle between the estimated line and the horizontal line may be an angle between a tangent line of a point on the curve and the horizontal line. The angle threshold may be default settings of the action recognition system 100, or may be adjustable under situations. For example, the angle threshold may be any value (e.g., 10°) within a range from 5° to 20°.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing engine 112 may first perform operation 806 to determine the estimated line before determining the middle image frame. As another example, after determining the middle frame, the processing engine 112 may determine whether the asymmetry parameter of the middle frame is larger than the max asymmetry ratio threshold before determining the first number count and the second number count.

Figure 9:
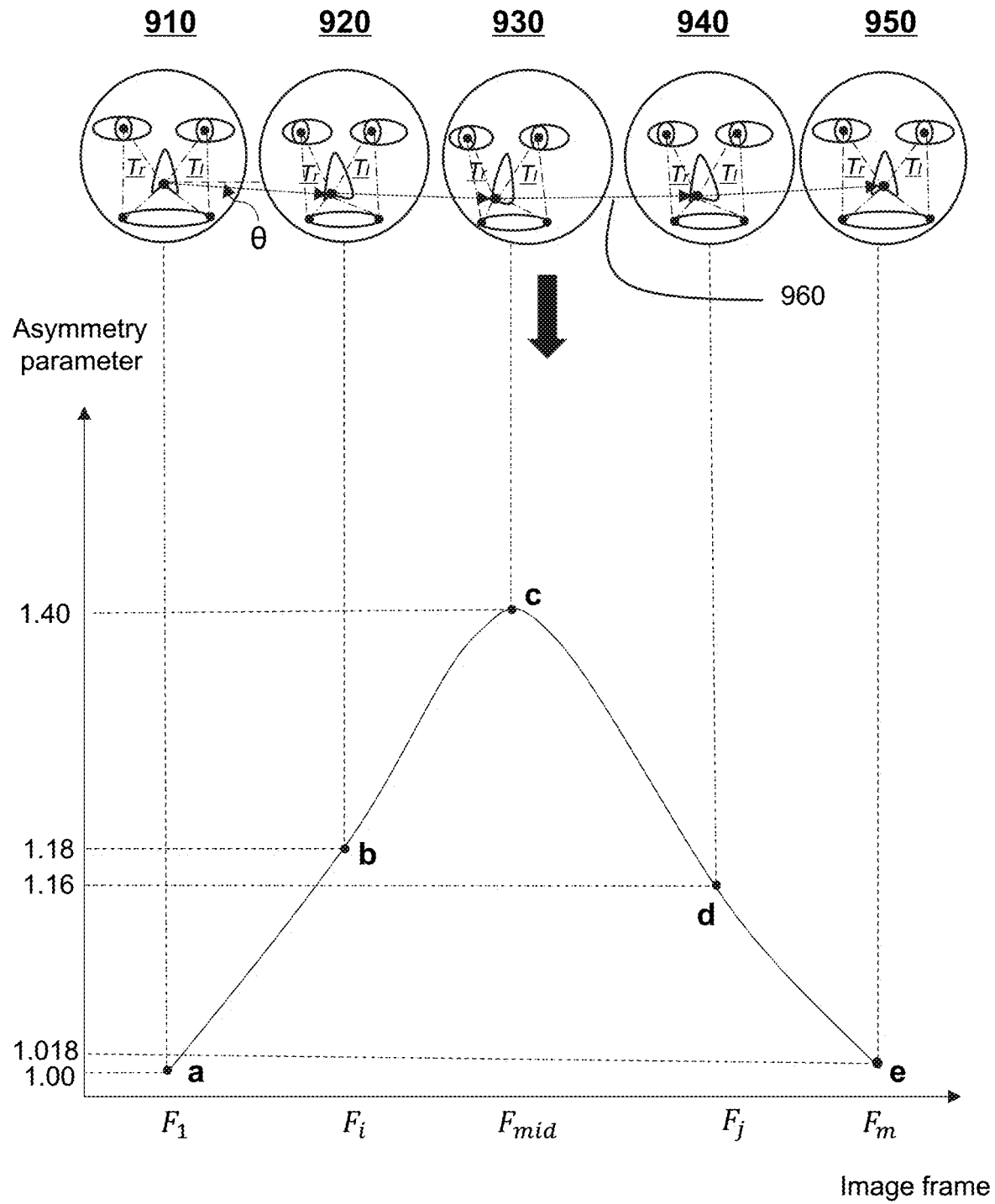
FIG. 9 is a schematic diagram illustrating an exemplary curve indicating a variation process of the asymmetry parameter during a shaking action according to some embodiments of the present disclosure.

FIG. 9 is a schematic diagram illustrating an exemplary curve indicating a variation process of the asymmetry parameter during a shaking action according to some embodiments of the present disclosure. As illustrated in FIG. 9, the horizontal axis refers to "image frame" and the vertical axis refers to "asymmetry parameter."

As described elsewhere in the present disclosure, the processing engine 112 may obtain a plurality of sequential target image frames associated with facial information of an object. The plurality of sequential target image frames include a start image frame $F_1$ having an asymmetry parameter less than a min asymmetry ratio threshold, a middle image frame $F_{mid}$ having a maximum asymmetry parameter, and an end image frame $F_m$ having an asymmetry parameter less than the min asymmetry ratio threshold. As illustrated in FIG. 9, a point a corresponds to the start image frame, a point c corresponds to the middle image frame, and a point e corresponds to the end image frame.

During a shacking action, as described in connection with 508, the start image frame may correspond to or substantially correspond to a start position corresponding to a time point when the face of the object is facing right to or substantially right to the camera device 130. As used herein, "substantially right to" refers to that an angle between a direction that the face of the object is facing to and a direction pointing right to the camera device 130 is less than a threshold for an ordinary person in the art. As illustrated in a face example 910, the asymmetry parameter of the start image frame is approximate to 1.0 which is less than the min asymmetry ratio threshold (e.g., 1.02). As the object shakes his/her head, as illustrated in a face example 920, the triangle area $T_l$ (i.e., the first area) associated with the left side of the face gradually increases and the triangle area $T_r$ (i.e., the second area) associated with the right side of the face gradually decreases. Accordingly, the asymmetry parameter between the left side and the right side gradually increases.

Further, as illustrated in a face example 930, the middle image frame corresponds to or substantially corresponds to a middle position corresponding to a time point when the asymmetry (e.g., 1.4) between the left side and the right side is maximum, which is larger than the max asymmetry ratio threshold (e.g., 1.2). The middle position may correspond to a stop position where the face of the object stops moving (or starts moving back).

Sequentially, the object will move from the middle position to an end position, which is the same as or substantially same as the start position. As used herein, "substantially same as" refers to that an angle between a direction that the object is facing to at the end position and a direction that the object is facing to at the start position is less than an angle threshold for ordinary person in the art. As illustrated in a face example 940, the triangle area $T_l$ (i.e., the first area) associated with the left side of the face gradually decreases and the triangle area $T_r$ (i.e., the second area) associated with the right side of the face gradually increases. Accordingly, the asymmetry parameter between the left side and the right side gradually decreases. Finally, as illustrated in a face example 950, the object moves to the end position corresponding to the end image frame, the asymmetry parameter of the end image frame is 1.018 which is less than the min asymmetry ratio threshold (e.g., 1.02).

Further, it can be seen an estimated line 960 determined by fitting the third feature points (e.g., a tip point of the nose) in the plurality of sequential target image frames. It is known that during the shaking action, the object may not shake his/her head strictly along the horizontal line, that is, the tip point of the nose may not always strictly on the horizontal line. Therefore, the processing engine 112 defines an angle threshold (e.g., 5°-20°), provided that an angle between the estimated line and the horizontal line is less than the angle threshold, it is considered that the identification of the shaking action is correct.

It also can be seen from FIG. 9 that a range between the point a and the point c corresponds to the first number count and a range between the point c and the point e correspond to the second number count. As described elsewhere in the present disclosure, the two number counts are also used in the identification of the shaking action.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system for action recognition, comprising:
   at least one storage medium including a set of instructions;
   at least one processor in communication with the at least one storage medium, wherein when executing the set of instructions, the at least one processor is directed to cause the system to:
   obtain a plurality of sequential target image frames associated with facial information of an object, each of the plurality of sequential target image frames including a plurality of feature points associated with the facial information;
   determine a first area and a second area based on the plurality of feature points in each of the plurality of sequential target image frames;
   determine an asymmetry parameter in each of the plurality of sequential target image frames based on the first area and the second area; and
   identify a shaking action in response to that the asymmetry parameter satisfies a preset condition.

2. The system of claim 1, wherein the plurality of feature points include a first feature point, a second feature point, a third feature point, a fourth feature point, and a fifth feature point, wherein,
   the first feature point and the second feature point are symmetrical relative to a vertical center line associated with the facial information;
   the fourth feature point and the fifth feature point are symmetrical relative to the vertical center line associated with the facial information; and
   the third feature point is on the vertical center line associated with the facial information.

3. The system of claim 2, wherein,
   the first feature point is a central point of a left eye;
   the second feature point is a central point of a right eye;
   the third feature point is a tip point of a nose;
   the fourth feature point is a left end point of a lip; and
   the fifth feature point is a right end point of the lip.

4. The system of claim 2, wherein to determine the first area and the second area based on the plurality of feature points in each of the plurality of sequential target image frames, the at least one processor is directed to cause the system further to:
   determine the first area based on the first feature point, the third feature point, and the fourth feature point; and
   determine the second area based on the second feature point, the third feature point, and the fifth feature point.

5. The system of claim 1, wherein to determine the asymmetry parameter in each of the plurality of sequential target image frames based on the first area and the second area, the at least one processor is directed to cause the system further to:
   determine a first ratio of the first area to the second area;
   determine a second ratio of the second area to the first area; and
   determine a larger one of the first ratio and the second ratio as the asymmetry parameter.

6. The system of claim 2, wherein to obtain the plurality of sequential target image frames associated with the facial information of the object, the at least one processor is directed to cause the system further to:
   obtain a plurality of sequential candidate image frames associated with the facial information of the object, wherein for each of the sequential candidate image frames, the third feature point is within a quadrangle determined based on the first feature point, the second feature point, the fourth feature point, and the fifth feature point;
   identify a start image frame of the plurality of sequential target image frames from the plurality of sequential candidate image frames, wherein the asymmetry parameter corresponding to the start image frame is less than a min asymmetry ratio threshold; and
   identify an end image frame of the plurality of sequential target image frames from the plurality of sequential candidate image frames, wherein the asymmetry parameter corresponding to the end image frame is less than the min asymmetry ratio threshold.

7. The system of claim 6, wherein to identify the shaking action in response to that the asymmetry parameter satisfies the preset condition, the at least one processor is directed to cause the system further to:
    identify a middle image frame having the maximum asymmetry parameter from the plurality of sequential target image frames;
    determine a first number count of sequential target image frames from the start image frame to the middle image frame and a second number count of sequential target image frames from the middle image frame to the end image frame;
    determine an estimated line by fitting the third feature points in the plurality of sequential target image frames; and
    identify the shaking action in response to that the asymmetry parameter of the middle image frame is larger than a max asymmetry ratio threshold, the first number count is larger than a first number count threshold, the second number count is larger than a second number count threshold, and an angle between the estimated line and a horizontal line is less than an angle threshold.

8. The system of claim 7, wherein the min asymmetry ratio threshold is 1.01-1.02.

9. The system of claim 7, wherein the max asymmetry ratio threshold is 1.2-1.3.

10. The system of claim 7, wherein the first number count threshold is 2-10 and second number count threshold is 2-10.

11. The system of claim 7, wherein the angle threshold is 5°-20°.

12. The system of claim 1, wherein the at least one processor is directed to cause the system further to:
    provide an authentication to a terminal device associated with the object in response to the identification of the shaking action.

13. The system of claim 1, further comprising a camera, which is configured to provide video data, form which the plurality of sequential target image frames are obtained.

14. A method for action recognition implemented on a computing device having at least one processor, at least one storage device, and a communication platform connected to a network, the method comprising:
    obtaining a plurality of sequential target image frames associated with facial information of an object, each of the plurality of sequential target image frames including a plurality of feature points associated with the facial information;
    determining a first area and a second area based on the plurality of feature points in each of the plurality of sequential target image frames;
    determining an asymmetry parameter in each of the plurality of sequential target image frames based on the first area and the second area; and
    identifying a shaking action in response to that the asymmetry parameter satisfies a preset condition.

15. The method of claim 14, wherein the plurality of feature points include a first feature point, a second feature point, a third feature point, a fourth feature point, and a fifth feature point, wherein,
    the first feature point and the second feature point are symmetrical relative to a vertical center line associated with the facial information;
    the fourth feature point and the fifth feature point are symmetrical relative to the vertical center line associated with the facial information; and
    the third feature point is on the vertical center line associated with the facial information.

16. The method of claim 15, wherein,
    the first feature point is a central point of a left eye;
    the second feature point is a central point of a right eye;
    the third feature point is a tip point of a nose;
    the fourth feature point is a left end point of a lip; and
    the fifth feature point is a right end point of the lip.

17. The method of claim 15, wherein determining the first area and the second area based on the plurality of feature points in each of the plurality of sequential target image frames comprises:
    determining the first area based on the first feature point, the third feature point, and the fourth feature point; and
    determining the second area based on the second feature point, the third feature point, and the fifth feature point.

18. The method of claim 14, wherein determining the asymmetry parameter in each of the plurality of sequential target image frames based on the first area and the second area comprises:
    determining a first ratio of the first area to the second area;
    determining a second ratio of the second area to the first area; and
    determining a larger one of the first ratio and the second ratio as the asymmetry parameter.

19. The method of claim 15, wherein obtaining the plurality of sequential target image frames associated with the facial information of the object comprises:
    obtaining a plurality of sequential candidate image frames associated with the facial information of the object, wherein for each of the sequential candidate image frames, the third feature point is within a quadrangle determined based on the first feature point, the second feature point, the fourth feature point, and the fifth feature point;
    identifying a start image frame of the plurality of sequential target image frames from the plurality of sequential candidate image frames, wherein the asymmetry parameter corresponding to the start image frame is less than a min asymmetry ratio threshold; and
    identifying an end image frame of the plurality of sequential target image frames from the plurality of sequential candidate image frames, wherein the asymmetry parameter corresponding to the end image frame is less than the min asymmetry ratio threshold.

20. A non-transitory computer readable medium comprising at least one set of instructions for action recognition, when executed by at least one processor, cause the at least one processor to effectuate a method comprising:
    obtaining a plurality of sequential target image frames associated with facial information of an object, each of the plurality of sequential target image frames including a plurality of feature points associated with the facial information;
    determining a first area and a second area based on the plurality of feature points in each of the plurality of sequential target image frames;
    determining an asymmetry parameter in each of the plurality of sequential target image frames based on the first area and the second area; and
    identifying a shaking action in response to that the asymmetry parameter satisfies a preset condition.

* * * * *